United States Patent
Bradley et al.

(10) Patent No.: US 10,394,622 B2
(45) Date of Patent: Aug. 27, 2019

(54) MANAGEMENT SYSTEM FOR NOTIFICATIONS USING CONTEXTUAL METADATA

(71) Applicant: International Business Machines Corporation, Armonk, NY (US)

(72) Inventors: Lisa M. W. Bradley, Cary, NC (US); Brian O'Donovan, Dublin (IR); Aaron J. Quirk, Cary, NC (US); Lin Sun, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/974,281

(22) Filed: Dec. 18, 2015

(65) Prior Publication Data

US 2017/0177423 A1   Jun. 22, 2017

(51) Int. Cl.
*G06F 9/54* (2006.01)
*H04M 1/725* (2006.01)

(52) U.S. Cl.
CPC ........ *G06F 9/542* (2013.01); *H04M 1/72569* (2013.01)

(58) Field of Classification Search
None
See application file for complete search history.

(56) References Cited

U.S. PATENT DOCUMENTS

| | | | |
|---|---|---|---|
| 2005/0128958 A1* | 6/2005 | Hamdan | H04W 48/08 370/254 |
| 2010/0002582 A1* | 1/2010 | Luft | H04W 74/0866 370/230.1 |
| 2011/0246754 A1* | 10/2011 | Porwal | G06F 1/1626 713/1 |
| 2013/0332721 A1 | 12/2013 | Chaudhri et al. | |
| 2014/0206328 A1 | 7/2014 | Varoglu et al. | |
| 2014/0253319 A1 | 9/2014 | Chang | |
| 2015/0215253 A1* | 7/2015 | Vemuri | H04L 51/12 709/206 |

* cited by examiner

*Primary Examiner* — Craig C Dorais
(74) *Attorney, Agent, or Firm* — Cantor Colburn LLP; Alexander Jochym

(57) ABSTRACT

Embodiments include method, systems and computer program products for managing notifications associated with an application using contextual metadata. In some embodiments, an application may generate a notification for an event. Contextual metadata may be collected. The contextual metadata may be analyzed. A determination may be generated that an action associated with the notification has been implemented. The notification may be dismissed based on the determination.

20 Claims, 3 Drawing Sheets

MANAGEMENT SYSTEM FOR NOTIFICATIONS USING CONTEXTUAL METADATA

BACKGROUND

The present disclosure relates to data storage solutions, and more specifically, to methods, systems and computer program products for a management system for notifications using contextual metadata.

Applications may leverage notification features of the operating system (OS) of a mobile device to expose important information to users. Examples of such information may include, but are not limited to, an upcoming calendar event, missed phone call, a communication from a social media contact, reminder to complete a task, or the like. Notifications can be useful tools. However, notifications can queue up quickly and may be cumbersome to manage. For example, there may be a period during which a user cannot immediately respond to and/or manage notifications (e.g., the user may be driving a car and may not be able to interact with their device for the duration of the drive). Once the user is able to interact with the device, there may be multiple notifications requiring attention.

SUMMARY

In accordance with an embodiment, a computer-implemented method may be provided. The method may include determining an application generated a notification for an event; collecting contextual metadata; analyzing the contextual metadata; generating, based on the contextual metadata, a determination that an action associated with the notification has been implemented; and dismissing the notification based on the determination.

In another embodiment, a computer program product may include a non-transitory storage medium readable by a processing circuit and storing instructions for execution by the processing circuit for performing a method comprising determining an application generated a notification for an event; collecting contextual metadata; analyzing the contextual metadata; generating, based on the contextual metadata, a determination that an action associated with the notification has been implemented; and dismissing the notification based on the determination.

In another embodiment, a system may include a processor in communication with one or more types of memory, wherein the processor may be configured to determine an application generated a notification for an event; collect contextual metadata; analyze the contextual metadata; generate, based on the contextual metadata, a determination that an action associated with the notification has been implemented; and dismiss the notification based on the determination.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for a management system for notifications using contextual metadata. This disclosure is directed to collecting contextual metadata, analyzing the contextual metadata, and determining whether the contextual metadata renders the notification obsolete. If the notification is obsolete, the management system may dismiss the notification.

The methods and systems described herein are directed to proactively dismissing application notifications by monitoring contextual cues from the user and their surrounding environment. Using the contextual cues (and associated contextual metadata), the methods and systems described herein determine if the intention of the notification has been handled by the user so that the notification may be removed from the device's notification queue. Thus, there is less clutter in the queue and the user is able to view important information that still needs to be addressed. In some embodiments, the methods and systems described herein may improve user experience with mobile applications and/or reduce likelihood of overlooking key information in a notification by a user.

In many cases, a user may take an action that renders a notification generated by an application out of date, but the notification may remain in the notification queue. For example, there may be a notification related to a missed phone call from a friend but the user may have met that friend at a park. There is no need to display the notification regarding the missed call to the friend since the user has physically met with the friend in the park. Similarly, there may be a reminder to attend a meeting but the user may already be attending the meeting in a conference room designated in the meeting invite. When notifications queue up, it may be easy to overlook key information due to the number of notifications the user must review.

In the systems and methods described herein, applications on a user device may generate notifications and display key information in the notifications to the user. Contextual metadata may be collected by the user device using one or more sensors associated with the device (e.g., microphone, global positioning system (GPS) sensor, accelerometer, camera, etc.) or by collecting data from one or more applications executing on the device (e.g., social media application, calendar, phone dialer, etc.). The contextual metadata may be analyzed (e.g., on the device and/or on a remote server) to determine whether an action has been taken by the user that renders the notification out-of-date or otherwise obsolete.

Figure 1:
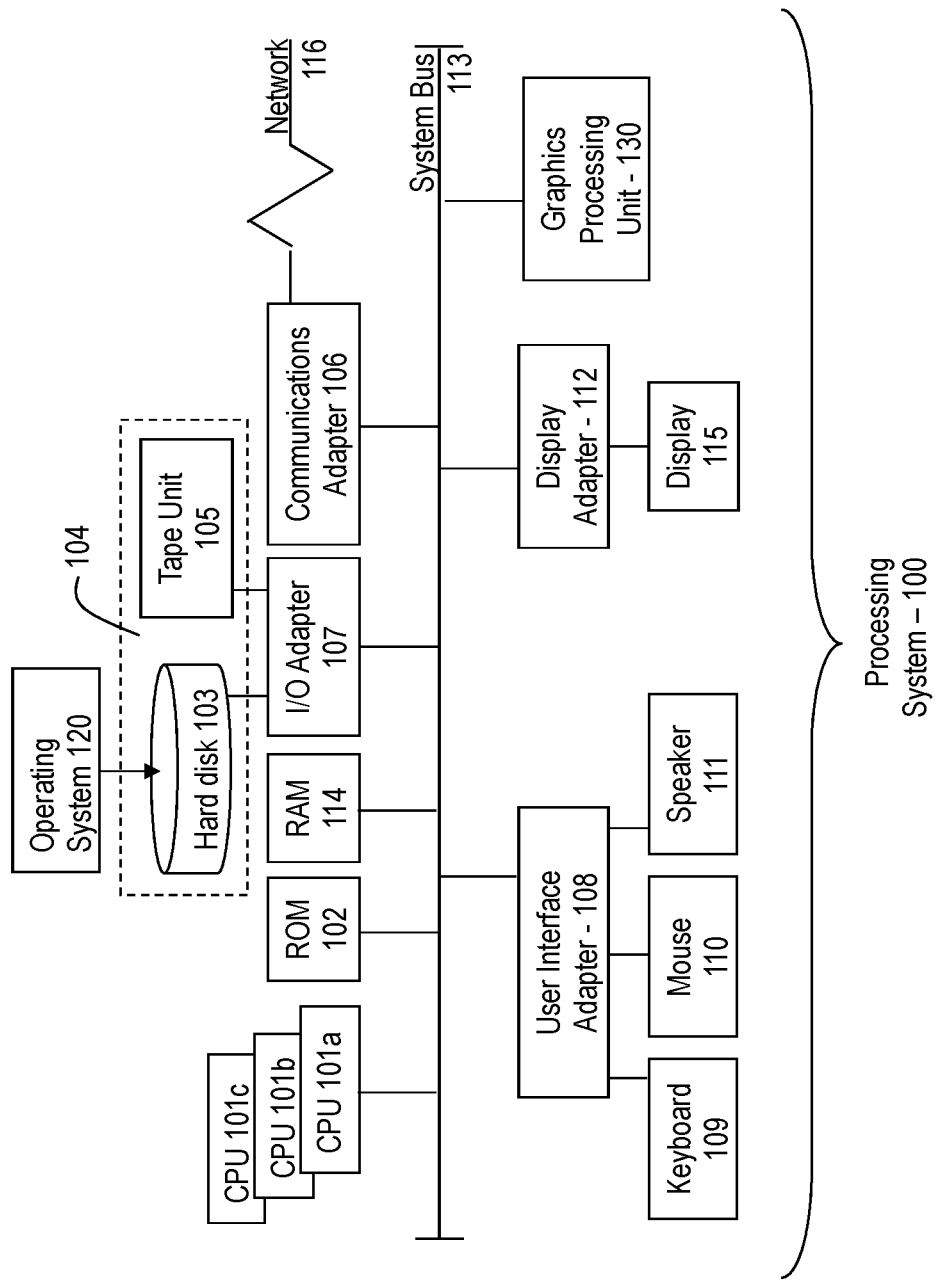
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113.

I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
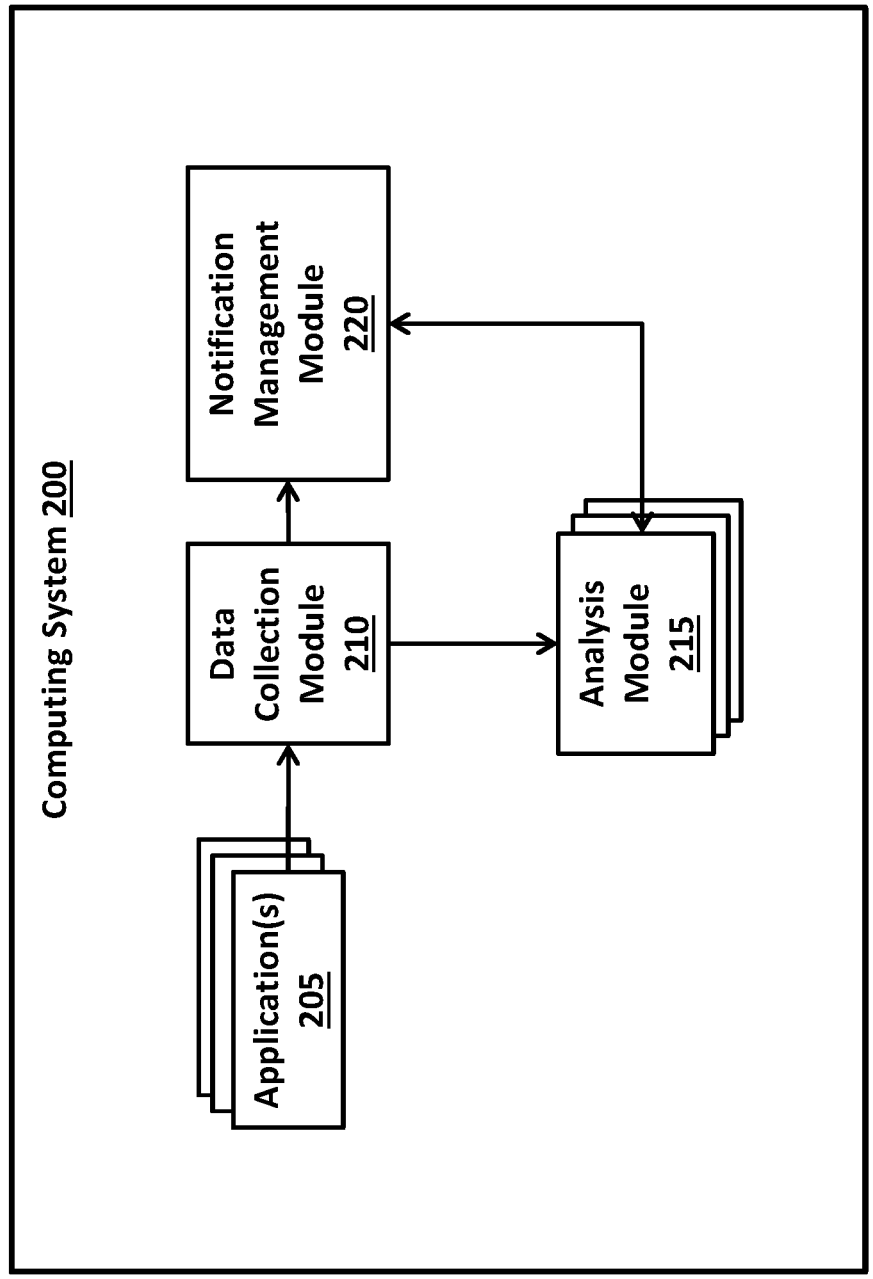
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, one or more applications 205, a data collection module 210, an analysis module 215, and/or a notification module 220.

The applications 205 may include computer-readable instructions that in response to execution by the processor(s) 101 cause operations to be performed including executing different functionality specific to the application(s) 205. An example of a functionality specific to the application(s) 205 may include a calendar functionality, event management functionality, conferencing functionality, and the like. In some embodiments, the application 205 may generate one or more notifications to display key information to a user. For example, an application 205 may generate a notification to inform and/or remind a user of an upcoming event, a missed called, a task to be completed or the like.

In some embodiments, the computing system 200 may include one or more data collection module(s) 210 may include computer-readable instructions that in response to execution by the processor(s) 101 cause operations to be performed including collecting data from one or more sensors associated with the computing system 200 (e.g., microphone, camera, GPS sensor, accelerometer, etc.). In some embodiments, the data collection module 210 may also collect data from one or more applications 205, which may include social media applications, calendar application, conferencing (e.g., phone or video conferencing), etc. The data collection module 210 may process the data collected and may coordinate transmittal of the processed data to an analysis module 215 for analysis.

In some embodiments, the computing system 200 may include one or more analysis module(s) 215 may include computer-readable instructions that in response to execution by the processor(s) 101 cause operations to be performed including receiving processed data from the data collection module 210. The analysis module 215 may analyze the received and determine whether the processed data from the data collection module 210 indicates that an event associated with a notification in a notification queue has been handled or addressed by the user. In some embodiments, the analysis module 215 may use contextual metadata associated with the collected data to determine whether an event associated with the notification in the notification queue has been handled or addressed by the user. The analysis module 215 may analyze the contextual metadata and may compare the data to one or more notifications in the notification queue. The analysis module 215 may communicate with the notification management module 220 to determine whether a notification in the notification queue is affected by the analyzed data determined by the analysis module 215. The analysis module 215 may transmit the determination to the notification management module 220.

In some embodiments, the computing system 200 may include one or more notification module(s) 220 may include computer-readable instructions that in response to execution by the processor(s) 101 cause operations to be performed including receiving the determination from the analysis module 215 indicating whether an event associated with the notification in the notification queue has been handled or addressed by the user. The notification management module 220 may identify the notification that the analysis module 215 determined was handled by the user. The notification management module 220 may dismiss and/or remove the notification from the notification queue based on the determination received from the analysis module 215.

Figure 3:
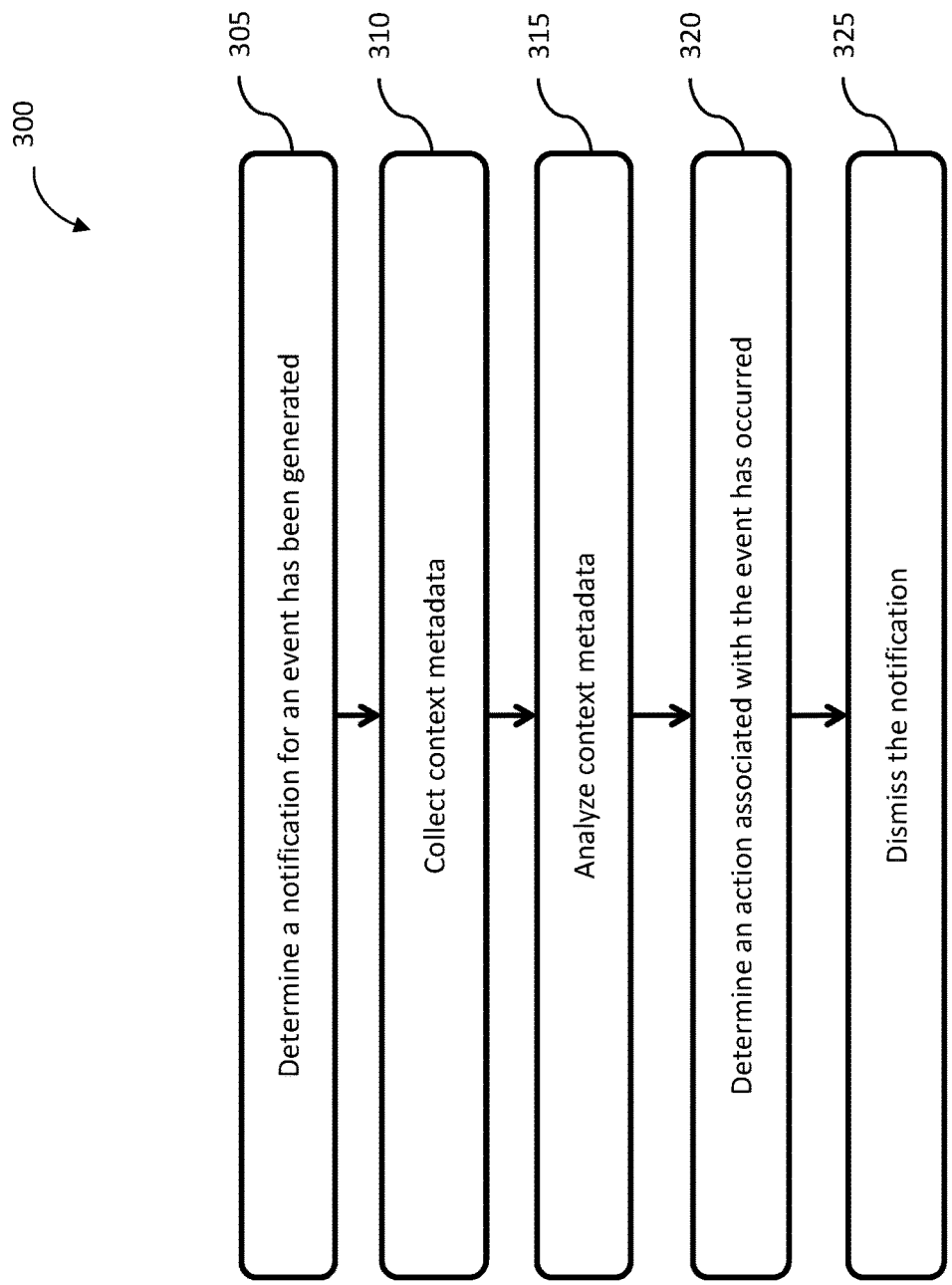
FIG. 3 is a flow diagram of a method for managing notifications using contextual metadata.

Referring now to FIG. 3, a flow diagram of a method 300 for managing notifications using contextual metadata in accordance with an exemplary embodiment is shown.

At block 305, a determination may be made that a notification for an event has been generated by an application 205. In some embodiments, the notification engine 220 may monitor the generation of the notification and placement of the notification in a notification queue.

At block 310, the data collection module 210 may collect contextual metadata from one or more sources. For example, the data collection module 210 may collect contextual metadata from one or more sensors associated with a computing system 200, such as a mobile device, smartphone, tablet, or the like. Example of the sensors may include, but are not limited to, microphones, cameras, GPS sensors, accelerometer, or the like. In some embodiments, the data collection module 210 may obtain information from one or more applications 205 executing on the computing system 200. In some embodiments, the data collection module 210 may generate contextual metadata associated with the collected data. In some embodiments, the data collection module 210 may process the collected data to generate contextual metadata. The data collection module 210 may transmit the contextual metadata to the analysis module 215.

At block 315, the analysis module 215 may receive the contextual metadata from the data collection module 210 and may analyze the received data. In some embodiments, the analysis module 215 may be located in the computing system 200. In some embodiments, the analysis module 215 may be located on one or more remote servers. If the analysis module 215 is located on a remote server, the data collection module 210 may transmit the contextual metadata to the analysis module 215 on the remote server. The data collection module 210 may receive an analysis of the contextual metadata and/or a determination made by the analysis module 215 based at least in part of the contextual metadata from the analysis module 215 on the remote server.

At block 320, the analysis module 215 may determine an action associated with the event has occurred, which renders the notification generated by the application 205 out of date or obsolete. Examples of analyzing the contextual metadata may include monitoring activity associated with a document or uniform resource locator (URL) associated with the event. For example, the analysis module 215 may determine whether a user has opened a document or URL related to a known calendar entry. The analysis module 215 may analyze the contextual metadata from the data collection module 210 to monitor for file activity related to specific resources associated with a notification or monitor network traffic related to a specific document associated with the notification. In some embodiments, the analysis module 215 may analyze the contextual metadata to monitor data collected from another device that may have a shared state with the computing system 200. For example, a web browser may provide history synchronization across devices utilized by a user. The analysis module 215 may obtain the shared state (e.g., history synchronization) to determine whether an action has been taken associated with the notification. In some embodiments, the analysis module 215 may monitor data from a cloud storage service, which may indicate action taken by the user on another device. The analysis module 215 may determine, based on the shared state contextual metadata (e.g., cloud storage data), where an action associated with the notification has been taken.

In another example, analyzing the contextual metadata may include comparing a location associated with the event and a current location of a user device obtained from a global positioning system (GPS) sensor. In some embodiments, the analysis module 215 may determine, using the contextual metadata that the user is traveling to a location associated with an event. In some embodiments, the analysis module 215 may compare the location associated with the event and the current location of the user. In some embodiments, the analysis module 215 may determine the user is currently present at the meeting location or may be traveling to the meeting location. In some embodiments, the analysis module 215 may monitor the current movement of the computing system 200 and determine whether the computing system 200 is moving in a trajectory at a given time that converges at the meeting location of the event. In some embodiments, the analysis module 215 may utilize data collected by a GPS sensor. In some embodiments, the analysis module 215 may utilize data collected from other sensors of the computing system 200 (e.g., accelerometer and/or compass data). In some embodiments, the analysis module 215 may determine the approximate direction and distance of the known meeting location in a building and may determine if the user is in the vicinity and heading in the direction of the meeting. In some embodiments, the analysis module 215 may analyze the contextual metadata to determine whether the user inputting data into a map application to determine if the user is attempting to navigate to a known meeting location.

In another example, to analyze the contextual metadata, the analysis module 215 may analyze the contextual metadata to determine that a number of users are in the proximity of a location of the event associated with the notification. In some embodiment, the analysis module 215 may determine that users are in the proximity of the location of the event by using contextual metadata from a social media check-in technology, presence technology, or ad-hoc network technology. In some embodiments, the analysis module 215 may compare the number of users in the proximity of the location of the event to a threshold. For example, the analysis module 215 may determine that a threshold has been set at 75% of the invited attendees need to be in attendance to deem the meeting or event started. The analysis module 215 may obtain the number of people invited to the event and the number of people detected in the proximity of the meeting location to determine the percentage of invited individuals who are attending the meeting. The analysis module 215 may compare the percentage to the threshold to determine whether the meeting has started.

In another example, analyzing the contextual metadata may further include collecting audio data associated with a computing system 200, such as a user device, processing the audio data, and identifying a person associated with the event using voice recognition or audio signature matching techniques to determine whether a person associated with an event is present. For example, the analysis module 215 may monitor the audio data to determine whether a voice matches a voice profile associated with a person associated with the event. In some embodiments, the systems and methods described herein may leverage existing art in voice recognition and signature matching to make such a determination. The analysis module 215 may use the contextual metadata (e.g., voice recording collected by the data collection module 210 from a phone call or from an in-person meeting) and compare the audio samples to profiles or signatures previously generated and associated with individuals. If the audio samples are above a given threshold, the analysis module 215 may determine there is a match and determine that the user of the computing system 200 has made contact, either by conference or in-person with the recognized individual. In some embodiments, the voice recognition or signature matching may be used to determine if known participants are in attendance at a meeting, to determine whether the user has had a face-to-face interaction with a person who left a voice mail message, to identify the contents of a voice mail message have been communicated to a user through a subsequent phone call or in-person meeting.

In another example, to analyze the contextual metadata may include determining a phone number associated with the event has been dialed. For example, the analysis module 215 may identify a number associated with an event or notification and check the phone application to determine whether the number has been dialed. In some embodiments, the analysis module 215 may determine whether the number has been dialed within a time window based on the time of the event (e.g., thirty minute prior to or after the scheduled event time). In some embodiments, the analysis module 215 may determine whether the phone number was dialed from the current computing system 200 and or another device that shares its state with the current computing system 200. In some embodiments, the analysis module 215 may monitor the contextual metadata to monitor current phone dialer activity or monitor an external dialer such as a dialer application (e.g., Skype, SoftPhone, etc.).

At block 325, the analysis module 215 may transmit the determination to the notification management module 220. The notification management module 220 may identify the relevant notification and may remove and/or dismiss the notification from the notification queue.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
determining that an application executing on a mobile computing device of a user generated a notification on the mobile computing device for an event, the event comprising an upcoming calendar appointment of the user, a missed telephone call of the user, or a communication from a social media contact of the user, and the application one of a calendar application, a conferencing application, and a social media application;
collecting contextual data from one or more sources associated with the mobile computing device, the sources comprising at least one selected from the group consisting of a sensor on the mobile computing device, the social media application, the calendar application, and the conferencing application;
generating contextual metadata using the contextual data;
analyzing the contextual metadata;
generating, based on the contextual metadata, a determination that an action associated with the notification has been implemented by the user, wherein the implementation of the action renders the notification obsolete; and
dismissing the notification from a notification queue of the user based on the determination that the action associated with the notification has been implemented by the user.

2. The computer-implemented method of claim 1, wherein analyzing the contextual metadata further comprises:
transmitting the contextual metadata to a remote server; and
receiving an analysis of the contextual metadata from the remote server.

3. The computer-implemented method of claim 1, wherein analyzing the contextual metadata further comprises:
monitoring activity associated with a document or uniform resource locator (URL) associated with the event.

4. The computer-implemented method of claim 1, wherein analyzing contextual metadata further comprises:
comparing a location associated with the event and a current location of a user device obtained from a global positioning system (GPS) sensor.

5. The computer-implemented method of claim 1, wherein analyzing contextual metadata further comprises:
determining a number of users proximate to a location of the event using a social media check-in technology, presence technology, or ad-hoc network technology; and
comparing the number of users proximate to the location of the event to a threshold.

6. The computer-implemented method of claim 1, wherein analyzing contextual metadata further comprises:
collecting audio data associated from a user device;
processing the audio data; and
identifying a person associated with the event using voice recognition or audio signature matching.

7. The computer-implemented method of claim 1, wherein analyzing contextual metadata further comprises:
determining a phone number associated with the event has been dialed.

8. A computer program product comprising a non-transitory storage medium readable by a processing circuit and storing instructions for execution by the processing circuit for performing a method comprising:
determining that an application executing on a mobile computing device of a user generated a notification on the mobile computing device for an event, the event comprising an upcoming calendar appointment of the user, a missed telephone call of the user, or a communication from a social media contact of the user, and the application one of a calendar application, a conferencing application, and a social media application;
collecting contextual data from one or more sources associated with the mobile computing device, the sources comprising a least one selected from the group consisting of a sensor on the mobile computing device, the social media application, the calendar application, and the conferencing application;
generating contextual metadata using the contextual data;
analyzing the contextual metadata;
generating, based on the contextual metadata, a determination that an action associated with the notification has been implemented by the user, wherein the implementation of the action renders the notification obsolete; and
dismissing the notification from a notification queue of the user based on the determination that the action associated with the notification has been implemented by the user.

9. The computer program product of claim 8, wherein analyzing the contextual metadata further comprises:
transmitting the contextual metadata to a remote server; and
receiving an analysis of the contextual metadata from the remote server.

10. The computer program product of claim 8, wherein analyzing contextual metadata further comprises:
monitoring activity associated with a document or uniform resource locator (URL) associated with the event.

11. The computer program product of claim 8, wherein analyzing contextual metadata further comprises:
comparing a location associated with the event and a current location of a user device obtained from a global positioning system (GPS) sensor.

12. The computer program product of claim 8, wherein analyzing contextual metadata further comprises:
determining a number of users proximate to a location of the event using a social media check-in technology, presence technology, or ad-hoc network technology; and
comparing the number of users proximate to the location of the event to a threshold.

13. The computer program product of claim 8, wherein analyzing contextual metadata further comprises:
collecting audio data associated from a user device;
processing the audio data; and
identifying a person associated with the event using voice recognition or audio signature matching.

14. The computer program product of claim 8, wherein analyzing contextual metadata further comprises:
determining a phone number associated with the event has been dialed.

15. A system, comprising:
a processor in communication with one or more types of memory, the processor configured to:
determine that an application executing on a mobile computing device of a user generated a notification on the mobile computing device for an event, the event comprising an upcoming calendar appointment of the user, a missed telephone call of the user, or a communication from a social media contact of the user, and the application one of a calendar application, a conferencing application, and a social media application;

collect contextual data from one or more sources associated with the computing device, the sources comprising at least one selected from the group consisting of a sensor on the mobile computing device, the social media application, the calendar application, and the conferencing application;

generate contextual metadata using the contextual data;

analyze the contextual metadata;

generate, based on the contextual metadata, a determination that an action associated with the notification has been implemented by the user, wherein the implementation of the action renders the notification obsolete; and dismiss the notification from a notification queue of the user based on the determination that the action associated with the notification has been implemented by the user; wherein:

the system is embodied in the mobile electronic device.

16. The system of claim 15, wherein, to analyze the contextual metadata, the processor is configured to:

transmit the contextual metadata to a remote server; and receive an analysis of the contextual metadata from the remote server.

17. The system of claim 15, wherein, to analyze contextual metadata, the processor is configured to:

monitor activity associated with a document or uniform resource locator (URL) associated with the event.

18. The system of claim 15, wherein, to analyze contextual metadata, the processor is configured to:

compare a location associated with the event and a current location of a user device obtained from a global positioning system (GPS) sensor.

19. The system of claim 15, wherein, to analyze contextual metadata, the processor is configured to:

determine a number of users proximate to a location of the event using a social media check-in technology, presence technology, or ad-hoc network technology; and compare the number of users proximate to the location of the event to a threshold.

20. The system of claim 15, wherein, to analyze contextual metadata, the processor is configured to:

collect audio data associated from a user device;

process the audio data; and identify a person associated with the event using voice recognition or audio signature matching.

* * * * *